(12) United States Patent
Hou

(10) Patent No.: US 7,866,888 B2
(45) Date of Patent: Jan. 11, 2011

(54) HYDRODYNAMIC BEARING WITH SLOPING SURFACE

(75) Inventor: Chuen-Shu Hou, Taipei Hsien (TW)

(73) Assignee: Foxconn Technology Co., Ltd., Tucheng, Taipei County (TW)

( * ) Notice: Subject to any disclaimer, the term of this patent is extended or adjusted under 35 U.S.C. 154(b) by 888 days.

(21) Appl. No.: 11/687,164

(22) Filed: Mar. 16, 2007

(65) Prior Publication Data

US 2008/0155828 A1    Jul. 3, 2008

(30) Foreign Application Priority Data

Dec. 29, 2006    (CN) .................. 2006 1 0064613

(51) Int. Cl.
*F16C 32/06*    (2006.01)
(52) U.S. Cl. ...................... 384/100; 384/123
(58) Field of Classification Search ................ 384/100, 384/107, 111, 114, 120, 123, 290–292, 298; 29/898.02
See application file for complete search history.

(56) References Cited

U.S. PATENT DOCUMENTS

| | | | | |
|---|---|---|---|---|
| 3,167,361 A | * | 1/1965 | Snapp et al. .................. 384/97 |
| 4,105,267 A | * | 8/1978 | Mori ........................... 384/291 |
| 4,916,749 A | * | 4/1990 | Urban et al. ................. 384/125 |
| 5,746,516 A | * | 5/1998 | Miyasaka et al. ............ 384/291 |
| 6,450,073 B1 | * | 9/2002 | Boyer et al. ................... 82/129 |
| 6,626,577 B1 | * | 9/2003 | Horng et al. ................. 384/292 |
| 6,769,808 B2 | * | 8/2004 | Shih et al. .................... 384/114 |
| 6,935,787 B2 | * | 8/2005 | Li ................................ 384/292 |

FOREIGN PATENT DOCUMENTS

| | | |
|---|---|---|
| CN | 2545404 Y | 4/2003 |
| CN | 1441530 A | 9/2003 |
| CN | 1619175 A | 5/2005 |
| JP | 2004254492 A * | 9/2004 |
| WO | 2005/113995 A2 | 12/2005 |

* cited by examiner

*Primary Examiner*—Marcus Charles
(74) *Attorney, Agent, or Firm*—Jeffrey T. Knapp

(57) ABSTRACT

A hydrodynamic bearing (300) has a bearing surface adapted for receiving a shaft to rotate thereon. The bearing surface has a plurality of grooves (34) defined therein. The grooves for generating hydrodynamic pressure each has at least one interior surface (3421). The at least one interior surface has a sloping surface along a circumferential direction of the hydrodynamic bearing.

7 Claims, 10 Drawing Sheets

HYDRODYNAMIC BEARING WITH SLOPING SURFACE

CROSS-REFERENCES TO RELATED APPLICATION

This application is related to U.S. patent application Ser. No. 11/627,566 filed on Jan. 26, 2007 and entitled "METHOD FOR MANUFACTURING HYDRODYNAMIC BEARING AND SHAFT"; the co-pending U.S. patent application is assigned to the same assignee as the instant application. The disclosure of the above-identified application is incorporated herein by reference.

BACKGROUND OF THE INVENTION

1. Field of the Invention

The present invention relates to a bearing and a shaft, and particularly to a method of manufacturing a bearing or a shaft with hydrodynamic pressure generating grooves.

2. Description of Related Art

At present, hydrodynamic bearings are widely used in spindle motors in devices, such as compact disc (CD) drivers, digital video disc (DVD) drivers, hard disk drivers, laser beam printers, floppy disk drivers or in heat-dissipation fans. Spindle motors require a hydrodynamic bearing of small size, high rotational accuracy and long life.

A typical hydrodynamic bearing defines a bearing hole therein. A shaft is rotatably received in the bearing hole. A plurality of herringbone-shaped grooves are defined either in an inner circumferential surface of the bearing or in an external circumferential surface of the shaft. The grooves can accommodate lubricant, such as oil. During rotation of the shaft, the lubricant is driven by the rotating shaft. A lubricating film is thus formed in a clearance between the external circumferential surface of the shaft and the inner circumferential surface of the bearing. Accordingly, the shaft is supported by hydrodynamic shearing stress and dynamic pressure generated by the lubricating film when the lubricant flows through different cross-sections. However, the dynamic pressure is not smooth due to perpendicular, step-like boundaries 110 of the herringbone-shaped grooves as shown in FIG. 9. The perpendicular, step-like boundaries cause a sudden dynamic pressure change while the lubricant flows through the boundaries. Consequently, the sudden dynamic pressure results in unsteady rotation of the shaft.

A related method for manufacturing a hydrodynamic bearing 50 shown in FIG. 10 comprises following processes of: (a1) manufacturing a bearing 52 with a bearing hole 54 therein; and (a2) defining a plurality of hydrodynamic pressure generating grooves 56 in a bearing surface 55 of the bearing 52 by chemical etching, electrolysis electric discharge or machining. However, the small size of the hydrodynamic bearing 50 results in difficulties in particularly in the making of the grooves 56 in the bearing surface 55 of the bearing 52. This makes manufacturing of the hydrodynamic bearing 50 both time-consuming and expensive. Therefore, the related method is not suitable for mass-production of the hydrodynamic bearing 50.

It is therefore desirable to provide an improved method for mass production of a hydrodynamic bearing which can provide a steady hydrodynamic pressure.

SUMMARY OF THE INVENTION

A hydrodynamic bearing has a bearing surface adapted for receiving a shaft to rotate thereon. The bearing surface has a plurality of grooves defined therein, the grooves for generating hydrodynamic pressure each has at least one interior surface. The at least one interior surface has a sloping (i.e., rounded) surface along a circumferential direction of the hydrodynamic bearing.

Other advantages and novel features of the present invention will become more apparent from the following detailed description of preferred embodiment when taken in conjunction with the accompanying drawings, in which:

BRIEF DESCRIPTION OF THE DRAWINGS

Many aspects of the present driving device can be better understood with reference to the following drawings. The components in the drawings are not necessarily drawn to scale, the emphasis instead being placed upon clearly illustrating the principles of the present driving device. Moreover, in the drawings, like reference numerals designate corresponding parts throughout the several views.

DETAILED DESCRIPTION OF THE INVENTION

Figure 1:
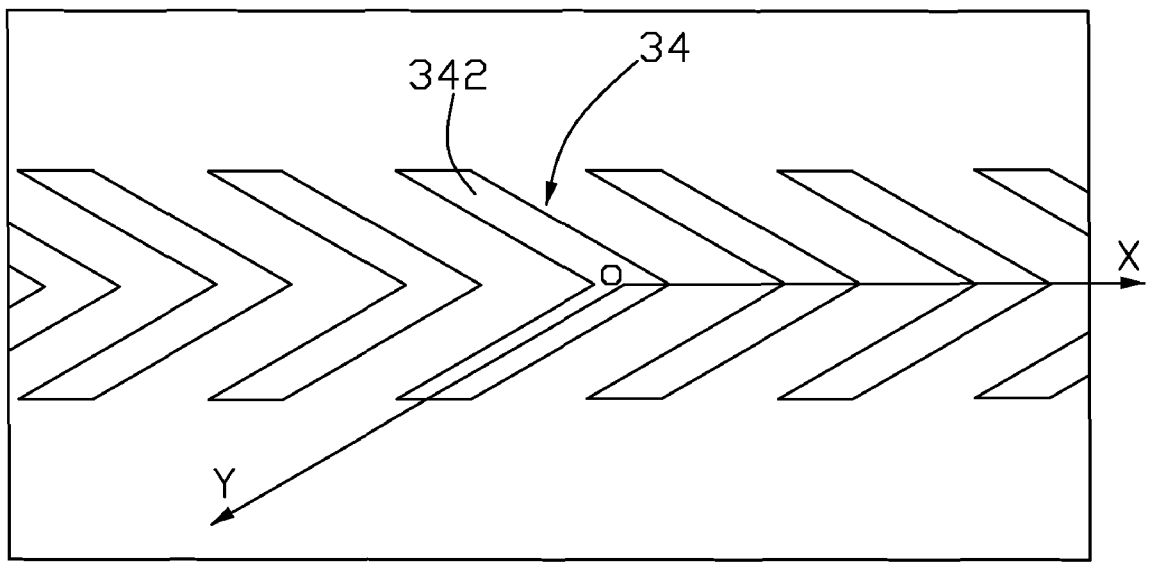
FIG. 1 is an expanded view in a circumferential direction of a plurality of herringbone-shaped grooves in a hydrodynamic bearing in accordance with a preferred embodiment of the present invention.
Figure 2:
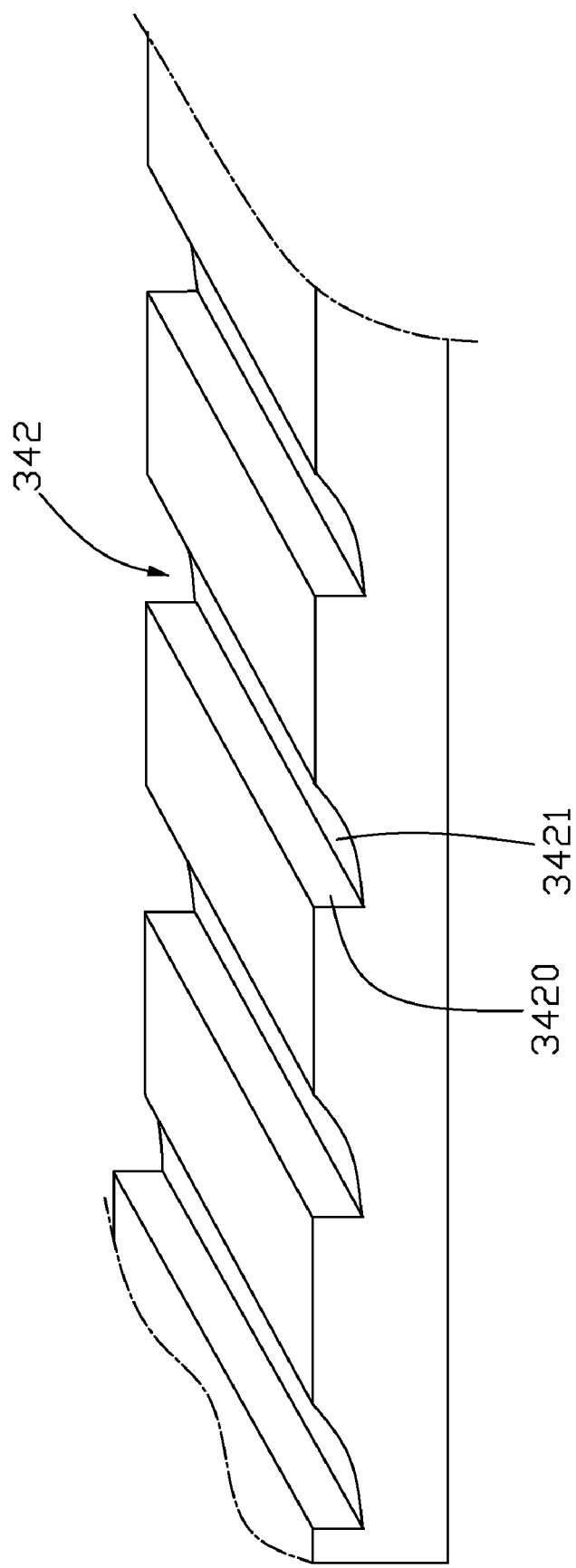
FIG. 2 is a partial isometric view of the FIG. 1.

Referring to FIG. 1 and FIG. 2, a hydrodynamic bearing 300 in accordance with a preferred embodiment of the present invention is shown. The hydrodynamic bearing 300 has a plurality of herringbone-shaped grooves 34 with less lubricant leakage that can provide good hydrodynamic action. The herringbone-shaped grooves 34 are spaced apart from each other and arranged in a circumferential direction of the bearing 300. Each of the grooves 34 includes two branches 342. An extension direction of the two branches 342 shown as direction OY deviates from a circumferential direction of the hydrodynamic bearing 300 shown as direction OX. Each branch 342 includes two connected interior surfaces 3420, 3421. The interior surface 3420 is a vertical plane surface and the interior surface 3421 is concave along the circumferential direction of the hydrodynamic bearing 300. The concave surface 3421 can cause a steady and gradual dynamic pressure change while the lubricant flows through the interior surface 3421. A shaft is engaged in a central hole of the hydrodynamic bearing 300. Consequently, the shaft can rotate more steadily.

Figure 3:
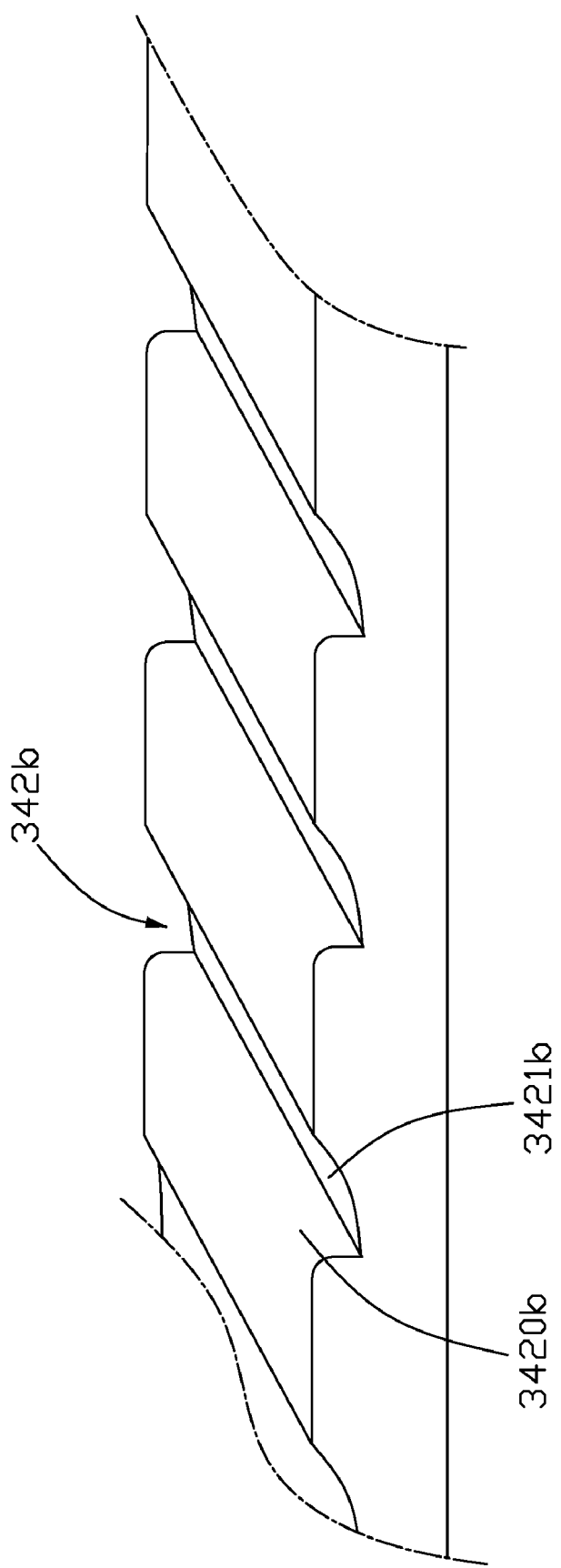
FIG. 3 is a partial expanded view of in a circumferential direction of a plurality of herringbone-shaped grooves in a hydrodynamic bearing in accordance with a second embodiment of the present invention.
Figure 4:
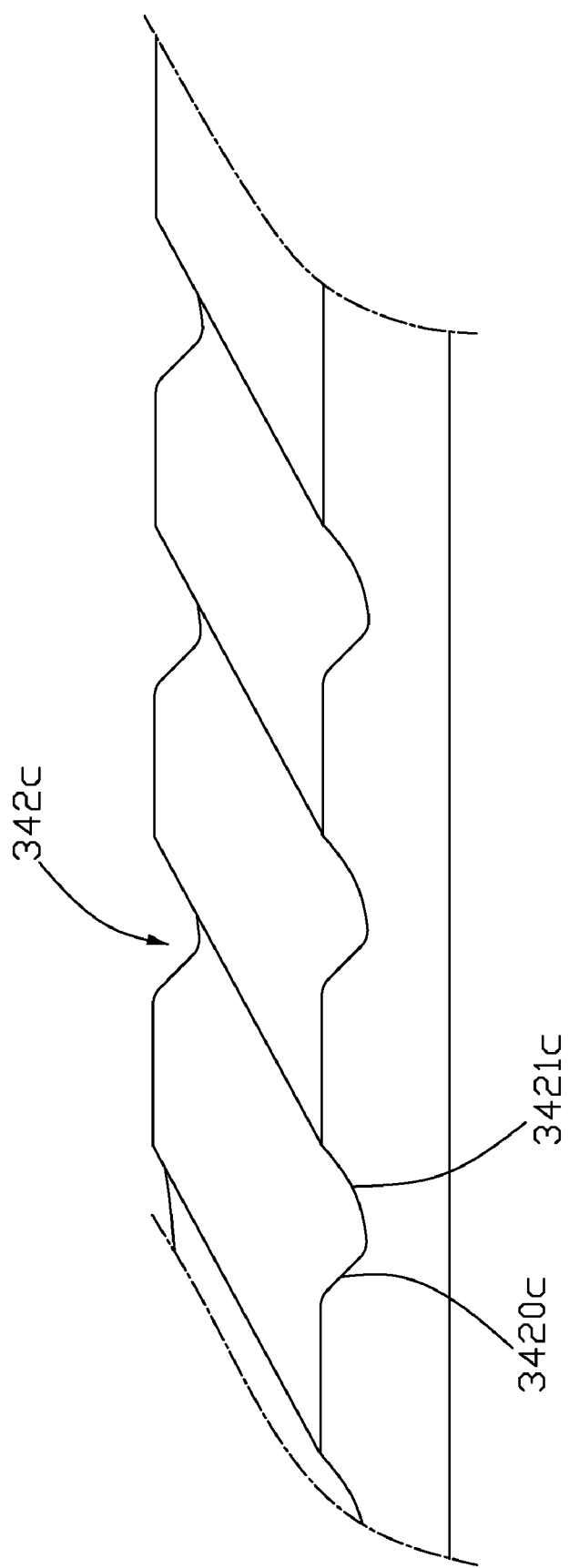
FIG. 4 is a partial expanded view of in a circumferential direction of a plurality of herringbone-shaped grooves in a hydrodynamic bearing in accordance with a third embodiment of the present invention.
Figure 5:
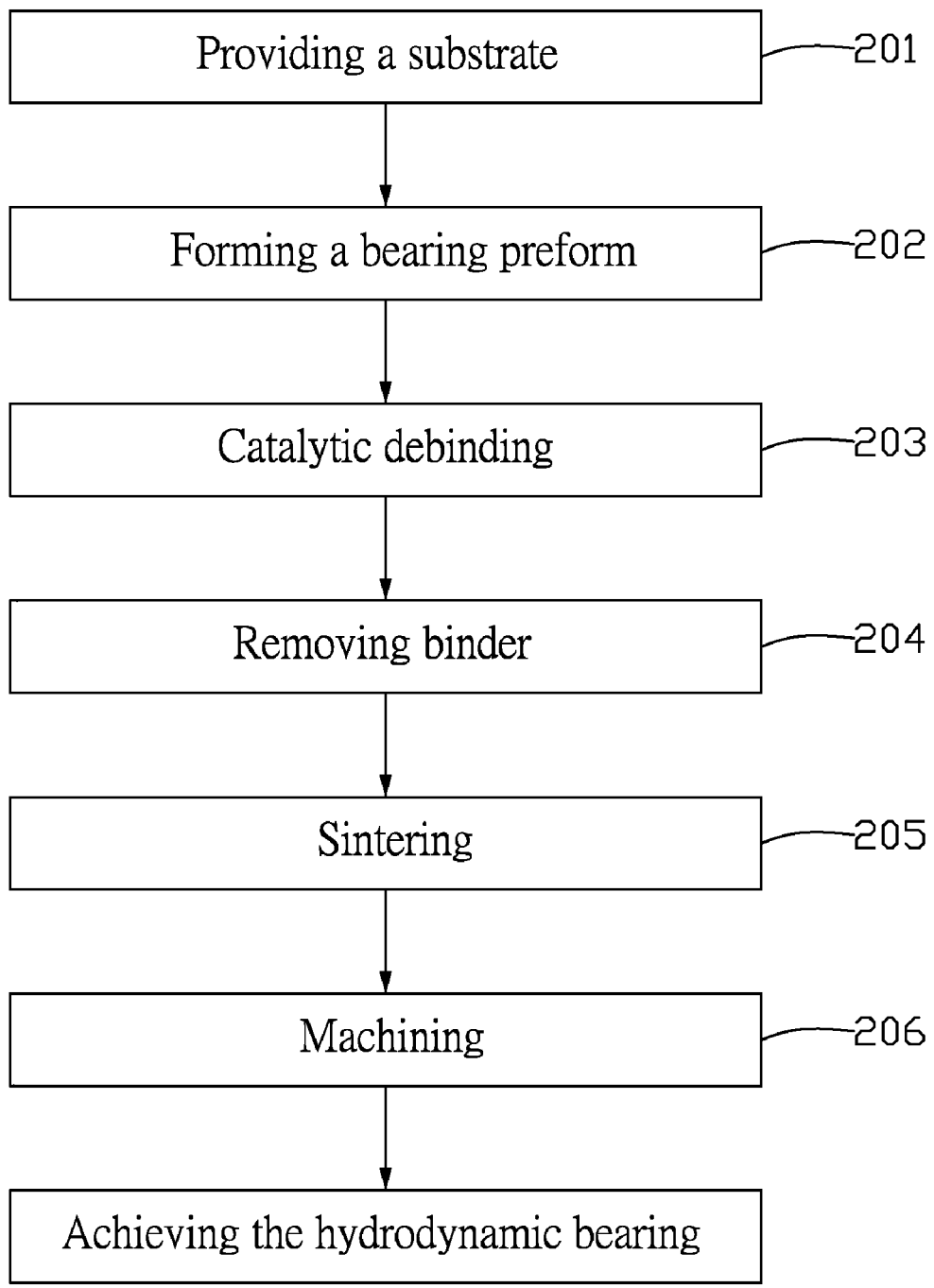
FIG. 5 is a flow chart of a method employed in manufacturing a hydrodynamic bearing in accordance with a preferred embodiment of the present invention.
Figure 6:
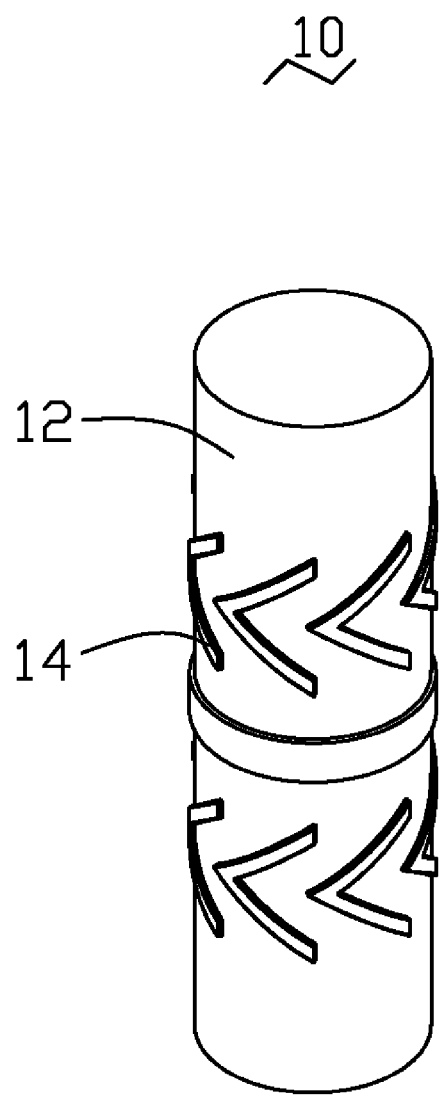
FIG. 6 is an isometric view of a substrate formed by the method in FIG. 5.
Figure 7:
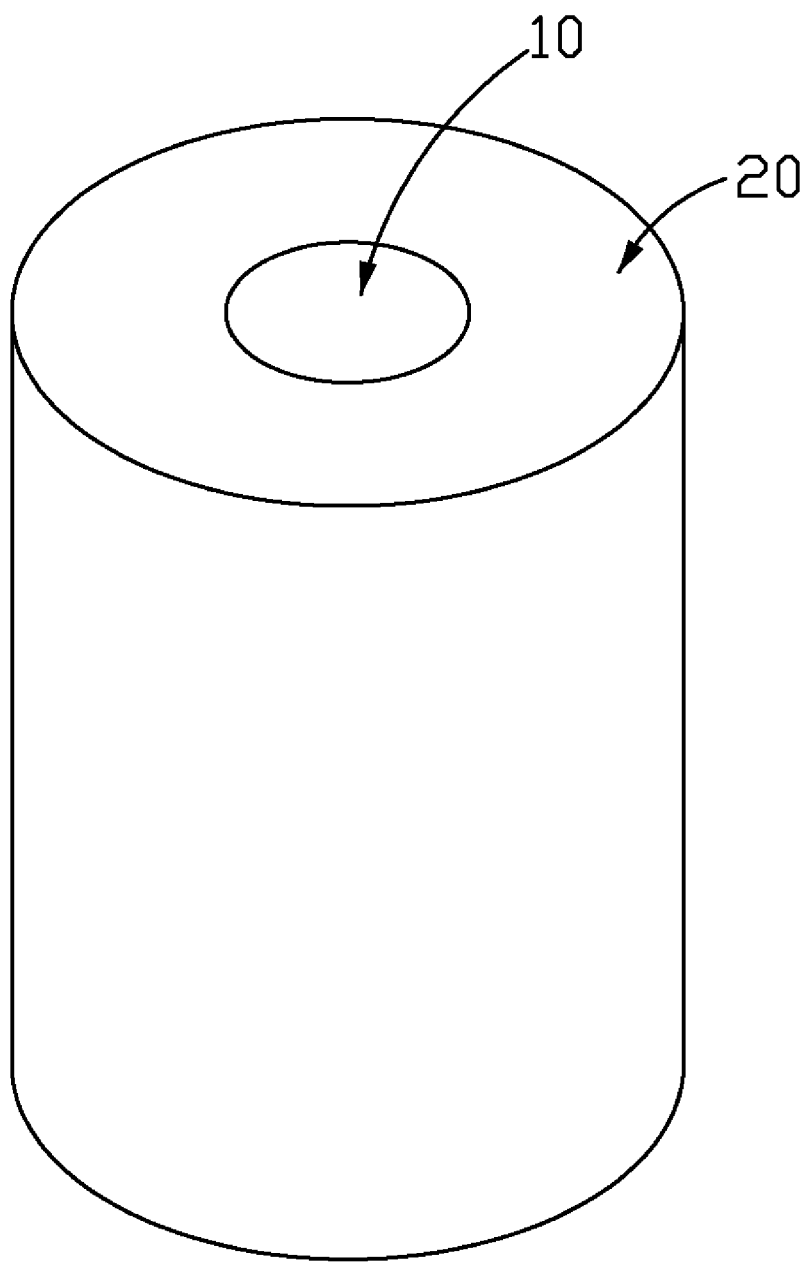
FIG. 7 is an isometric view of the substrate of FIG. 5 surrounded by a bearing preform.
Figure 8:
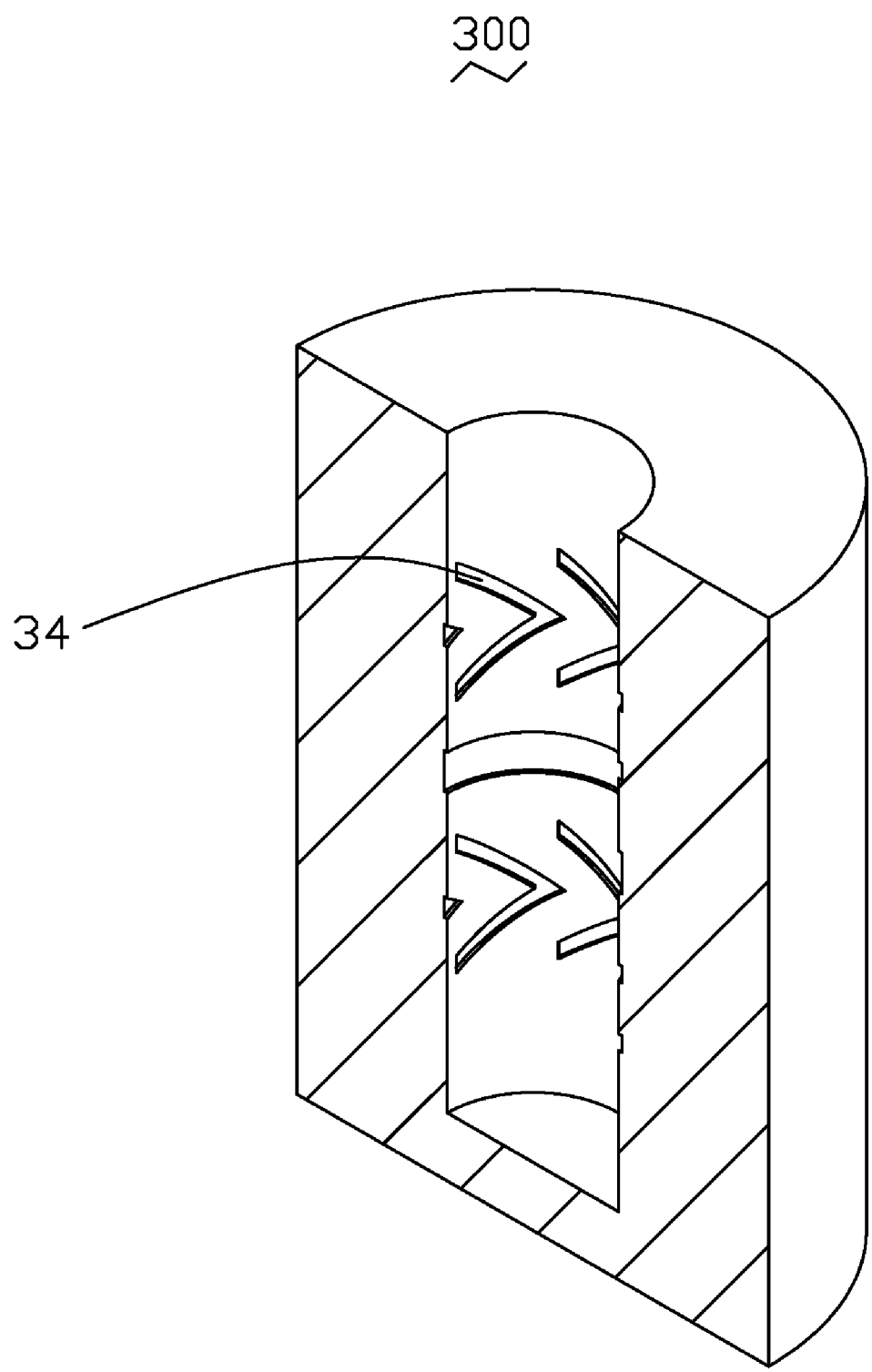
FIG. 8 is a cross-sectional, isometric view of a hydrodynamic bearing obtained by the method of FIG. 5.
Figure 9:
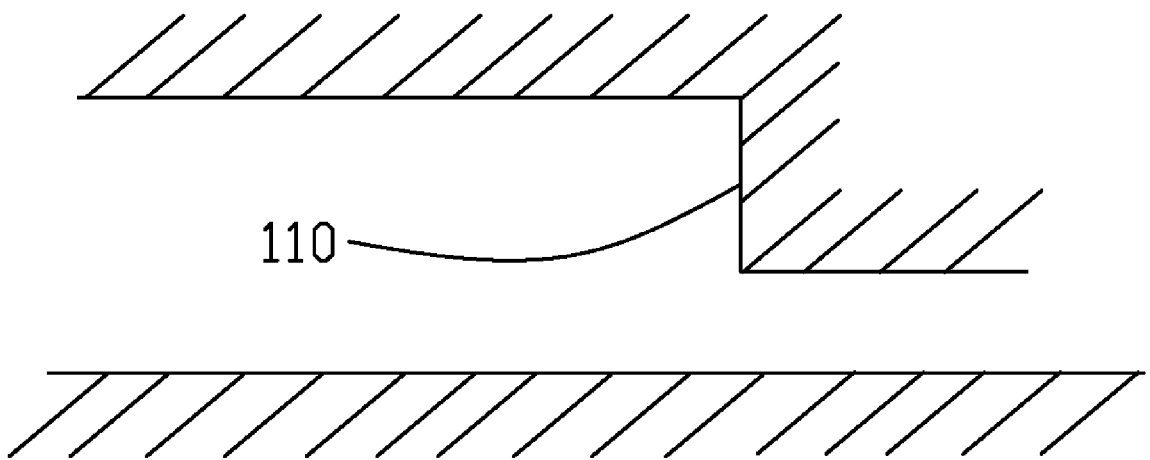
FIG. 9 is a partial view of facing side edges of a shaft and a related hydrodynamic bearing.
Figure 10:
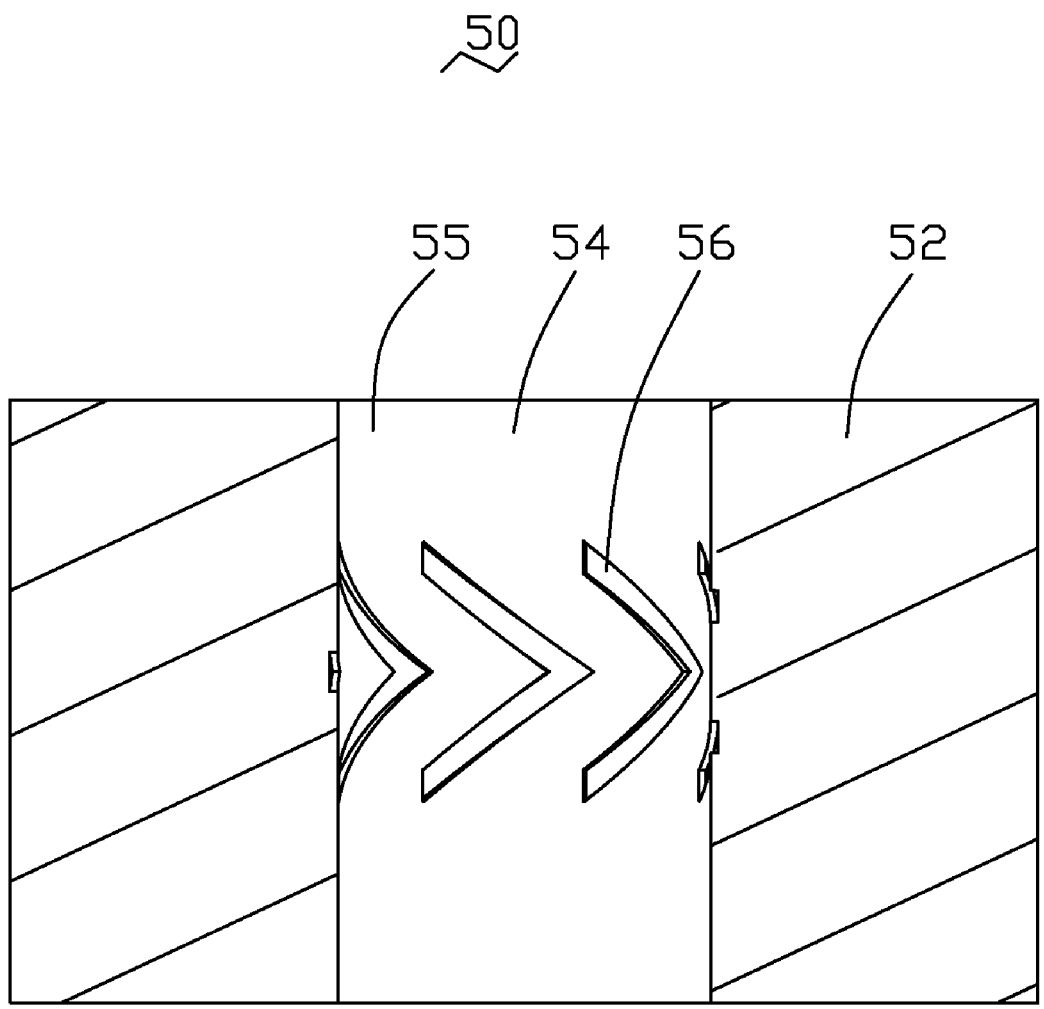
FIG. 10 is a cross-sectional view of a related hydrodynamic bearing.

Furthermore, the two branches 342 can be shaped to form two branches 342b, 342c shown as FIG. 3 and FIG. 4 respectively. Each branch 342b includes two connected interior surfaces 3420b, 3421 b. The two interior surfaces 3420b, 3421 b have the same configurations with the surfaces 3420, 3421 respectively of FIG. 2. The difference between the branch 342b and the branch 342 is that a boundary between the straight interior surface 3420b and an inner circumferential surface of the hydrodynamic bearing 300 is an arc chamfer. Each branch 342c includes two connected interior surfaces 3420c, 3421c. The interior surface 3421c has the same configuration as the surface 3421b. The difference between the branch 342c and the branch 342b is that the interior surface 3420c is an inclined surface. When herringbone-shaped grooves (not shown) defined by the branches 342b or 342c are used to generate dynamic pressure, the pressure will change gradually and steadily. For example, the pressure will increase gradually when the lubricant flows out of the branches 342b or 342c through the interior surface 3421b or 3421c. The pressure will decrease gradually when the lubricant flows into the branches 342b or 342c through the interior surface 3420b or 3420c. Thus, the shaft can rotate more steadily.

As described above, each of the branches 342,342b,342c has at least a surface that has a sloping surface along a circumferential direction of the hydrodynamic bearing 300. A plurality of herringbone-shaped grooves configured by the branches 342,342b or 342c can also been defined in a shaft that is adapted to be engaged in a bearing.

As shown in FIG. 5 to FIG. 8, a method for manufacturing the hydrodynamic bearing 300 configured by the branches 342 can also be used to manufacture a hydrodynamic bearing (not shown) defined by the branches 342b or 342c. The method for manufacturing the hydrodynamic bearing 300 in accordance with the present invention, comprises steps of:

step 201: providing a substrate 10 with a plurality of protrusions 14 formed on a periphery thereof;

step 202: placing the substrate 10 in a middle of a hollow mold, then injecting a feedstock of powder and molten binder into the mold to surround the substrate 10 under pressure, thus forming a desired bearing preform 20;

step 203: separating the substrate 10 from the bearing preform 20 by means of catalytic debinding;

step 204: separating the binder from the bearing preform 20;

step 205: sintering the bearing preform 20;

step 206: performing a precision machining to the bearing preform 20, thereby forming the desired hydrodynamic bearing 300.

The substrate 10 should be shaped to conform to the grooves 34 of the hydrodynamic bearing 300 so that an external periphery of the substrate 10 corresponds to an inner surface of the desired hydrodynamic bearing 300. The substrate 10 comprises a cylindrical body 12 and a plurality of herringbone-shaped protrusions 14 formed on a circumferential surface of the body 12. The body 12 forms a bearing hole of the hydrodynamic bearing 300 and the protrusions 14 are used to form the herringbone-shaped grooves 34 of the hydrodynamic bearing 300. Each of the protrusions 14 includes two branches 141. The protrusions 14 are spaced from each other and distributed regularly in two rows. Edges of each branch 141 along a circumferential direction of the body 12 are constructed to have sloping surfaces according to shapes of the branches 342,342b or 342c.

Step 201 is described in detail as follows: a material for forming the substrate 10 should meet requirements for steps 202 and 203. In step 202, a melting point of the material for forming the substrate 10 is required to be higher than that of the molten binder of the feedstock to prevent the substrate 10 from being deformed when the substrate 10 contacts with the feedstock. On the other hand, in step 203, the material for forming the substrate 10 should be easily separable from the hydrodynamic bearing preform 20 by means of debinding. For example, polyoxymethylene (POM) can be used as a material for the substrate 10. POM has many advantages such as excellent mechanical properties (i.e. rigidity, impact resistant, low abrasion, creep resistance), outstanding chemical properties (i.e. hydrolytic stability fatigue endurance and solvent resistance) and good thermal stability. The substrate 10 composed of POM can be made by means of injection molding, extrusion molding, blow molding, rotational molding, soldering, adhering, coating, plating, machining and so on. Injection molding can be used for making the desired substrate 10 and includes steps of: (c1) melting the material for the substrate 10; (c2) injecting the molten material into a mold (not shown) to form the substrate 10; (c3) cooling the mold and taking the substrate 10 out of the mold. Injection molding can be performed in a normal injection machine. The material for forming the substrate 10 further comprises dispersant, surfactant and additive.

Step 202 is described in detail as follows: the hydrodynamic bearing preform 20 can be formed by metal injection molding (MIM) when the substrate 10 is mainly composed of POM. The feedstock generally comprises metal powder or ceramic powder. The binder of the feedstock is required to have a lower melting point than that of the substrate 10 and to be easily removable by debinding or extraction, such as polyethylene (PE). MIM includes the following processes: (d1) mixing the powder and the binder to form the feedstock at high temperature; (d2) pushing the feedstock to form a desired shape such as the hydrodynamic bearing preform 20 in a mold under pressure. The injection machine used in step 201 for forming the substrate 10 can be used to manufacture the hydrodynamic bearing preform 20 in step 202. MIM used for manufacturing the hydrodynamic bearing preform 20 has many advantages such as high shape complexity, low cost, tight tolerances, high density, high performance etc.

Step 203 is described in detail as follows: the debinding methods available include thermal cracking debinding and catalytic debinding. Catalytic debinding is used to separate the substrate 10 from the hydrodynamic bearing preform 20 in accordance with a preferred embodiment of the present invention. Catalytic debinding comprises following processes: (e1) placing the hydrodynamic bearing preform 20 made by step 202 in a central area of a furnace for debinding; (e2) Inputting nitric acid ($HNO_3$) gas as a catalyzer into the furnace at a temperature in an approximate range of between 110° C. and 140° C. that is lower than a melting point of the hydrodynamic bearing preform 20. POM reacts with $HNO_3$ and decomposes to gaseous formaldehyde in the acid and thermal atmosphere so that the substrate 10 could be quickly removed from the hydrodynamic bearing preform 20. Thus the rate of debinding is increased and the hydrodynamic bearing preform 20 is given good shape retention by means of catalytic debinding; however, when use the thermal cracking debinding process, the hydrodynamic bearing preform 20 is inclined to break during the thermal cracking debinding process because of the difference between a coefficient of expansion of the substrate 10 and that of the hydrodynamic bearing preform 20. Accordingly, the catalytic cracking debinding is preferred than the thermal cracking debinding in the present invention. In spite of this, the thermal cracking debinding still can be used to achieve the debinding of the substrate 10 if the heating process thereof is precisely controlled. Furthermore, the gaseous formaldehyde produced during the catalytic debinding process is transferred to another part of the furnace to burn into carbon dioxide ($CO_2$) and nitrogen dioxide ($NO_2$), which are not toxic. As a result, the bearing 300 has accurate size and concentricity.

Step 204 is described in detail as follows: after the substrate 10 is separated from the bearing preform 20, the binder can be removed from the bearing preform 20 by means of thermal debinding or extraction.

Step 205 is described in detail as follows: after the binder is separated from the bearing preform 20, the bearing preform 20 consequently becomes weak. Therefore, it is necessary to sinter the bearing preform 20 in place. The sintering process can be performed in a vacuum, or in an oxygen and/or nitrogen atmosphere.

Step 206 is described in detail as follows: generally, the hydrodynamic bearing preform 20 is inclined to deform during sintering processes. In order to make a hydrodynamic bearing preform 20 having a high level of precision in its manufacture, it is necessary to perform a machining operation on the bearing preform 20 using methods such as broaching, grinding, milling, polishing, and so on.

Furthermore, the method in accordance with the preferred embodiment of the present invention can be used for manufacturing other kinds of hydrodynamic bearings or shaft with different shapes of grooves. When using the method to make a desired shaft with hydrodynamic pressure generating grooves formed in a circumferential surface thereof, a substrate with a central hole defined therein should be provided. An internal surface of the substrate is required to correspond in shape to the circumferential surface of the desired shaft.

Compared with the related method for manufacturing the hydrodynamic bearing 50, the hydrodynamic bearing 300 is configured (i.e., structured and arranged) for mass-production by the method in accordance with the preferred embodiment of the present invention. Also, the hydrodynamic bearing 300 manufactured by the present method has accurate size and concentricity.

It is to be understood that the above-described methods are intended to illustrate rather than limit the invention. Variations may be made to the methods without departing from the spirit of the invention. Accordingly, it is appropriate that the appended claims be construed broadly and in a manner consistent with the scope of the invention.

What is claimed is:

1. A hydrodynamic bearing having a bearing surface adapted for receiving a shaft to rotate thereon, the bearing surface having a plurality of grooves defined therein, the grooves for generating hydrodynamic pressure each comprising a first interior surface and a second interior surface both intersecting the bearing surface, the first interior surface and the second interior surface being spaced apart from each other at the bearing surface, and intersecting each other at a side thereof farthest away from a central axis of the hydrodynamic bearing to form an intersecting line in the bearing, the first interior surface sloping along a circumferential direction of the hydrodynamic bearing, the second interior surface being a vertical plane surface and being perpendicular to the bearing surface.

2. The hydrodynamic bearing as claimed in claim 1, wherein the grooves of the hydrodynamic bearing are distributed around a circumferential direction of the bearing surface of the hydrodynamic bearing.

3. The hydrodynamic bearing as claimed in claim 1, wherein the grooves of the hydrodynamic bearing are herringbone-shaped.

4. The hydrodynamic bearing as claimed in claim 1, wherein a boundary between the second interior surface and the bearing surface is an arc chamfer.

5. The hydrodynamic bearing as claimed in claim 4, wherein the first interior surface is concave, a pressure of a lubricant increasing gradually when the lubricant flows out of the groove along the first interior surface of the groove, and the pressure of the lubricant decreasing gradually when the lubricant flows into the groove along the second interior surface of the groove.

6. The hydrodynamic bearing as claimed in claim 1, wherein the first interior surface is concave, a pressure of a lubricant increasing gradually when the lubricant flows out of the groove along the first interior surface of the groove, and the pressure of the lubricant decreasing gradually when the lubricant flows into the groove along the second interior surface of the groove.

7. A hydrodynamic bearing having a bearing surface adapted for receiving a shaft to rotate thereon, the bearing surface having a plurality of grooves defined therein, the grooves for generating hydrodynamic pressure each comprising a first interior surface and a second interior surface both intersecting the bearing surface, the first interior surface and the second interior surface being spaced apart from each other at the bearing surface, and intersecting each other at a side thereof farthest away from a central axis of the hydrodynamic bearing to form an intersecting line in the bearing, the first interior surface being concave and sloping along a circumferential direction of the hydrodynamic bearing, the second interior surface being inclined along the circumferential direction of the hydrodynamic bearing, a pressure of a lubricant increasing gradually when the lubricant flows out of the groove along the first interior surface of the groove, and the pressure of the lubricant decreasing gradually when the lubricant flows into the groove along the second interior surface of the groove.

\* \* \* \* \*